United States Patent Office 3,324,025
Patented June 6, 1967

3,324,025
METHOD OF TREATING ELECTRODES FOR USE IN ELECTROCHEMICAL DEVICES
Norman Hackerman and Nelson N. Estes, Austin, Tex., assignors to Union Carbide Corporation, a corporation of New York
No Drawing. Filed Aug. 16, 1963, Ser. No. 302,729
5 Claims. (Cl. 204—292)

This invention relates to electrochemical devices and more particularly to a method of treating electrodes for use in said devices.

Recently a family of electrochemical devices which utilize solutions of ions has attracted considerable favorable attention. These devices, which have been termed "solions," are described in a paper by Hurd and Lane, "Principles of Very Low Power Electrochemical Control Devices," "Journal of the Electrochemical Society," volume 104, No. 12, December 1957. Solions function by electrolytic transfer of at least one chemical species in a reversible redox system in which measurement of the transfer of one of such species is made. Representative electrolyte systems for use in solions include the iodine-iodide system, the bromine-bromide system and the ceric-cerous system.

The solion device itself generally comprises a unit of two or more compartments containing an electrolyte solution of the species in a solvent, which compartments are connected through an electrolytically conductive path such as a porous partition. Typical solion devices of this kind are described and claimed in United States Patent No. 2,890,414, issued to Earl S. Snavely, Jr. on June 9, 1959, and United States Patent No. 3,021,482, issued to N. N. Estes on Feb. 13, 1962.

In typical solions, the electrodes are usually composed of platinum or other inert material such as the carbides, nitrides, silicides and borides of the transition metals of Groups IV–B, V–B, and VI–B of the Periodic Table described and claimed in United States patent application Ser. No. 34,969 filed on June 9, 1960, and now abandoned, by R. A. Powers et al. Among those materials, tantalum carbide is excellent for use as the electrodes in a solion. Generally, only the active surface portions of the electrode, that is the surface of the electrode exposed to the electrolyte, need be composed of the inert material. A typical electrode may be composed of a tantalum metal substrate and a surface portion of tantalum carbide.

It has been observed that the electrodes commonly associated with solions suffer from certain inherent disadvantages. For example, it has been shown that the electrode material, e.g., platinum, tends to dissolve in the electrolyte in amounts which are sufficient to cause erratic behavior and reduced life of the solion device. It has also been shown that the concentration of the oxidizable species of the redox electrolyte system tends to decrease with time. The rate of decrease has been found to be accelerated by elevated temperatures.

It is a general object of this invention to provide a method for improving the performance of electrodes for use in electrochemical devices.

It is another object of the invention to provide improved electrodes suitable for use in solion devices.

It is a concurrent object to provide a means to overcome the disadvantages associated with changing concentration of the oxidizable species of the solion electrolyte.

It is a further object to provide solion devices of improved stability.

These and other related objects are achieved by treating the electrode material with a stabilizing compound which contains sulfur, selenium or arsenic. Preferred stabilizing compounds are hydrogen sulfide, hydrogen selenide, and hydrogen arsenide. While the above named compounds are preferred for adding sulfide, selenide, or arsenide ions to the electrode material, it will be appreciated that any compound containing or forming such ions is also applicable to this invention and may be employed in the herein disclosed process.

In general, improved stability is achieved by exposing the electrode to an environment containing the selected stabilizing compound for a period of time sufficient to provide the desired degree of stabilization. The temperature at which the stabilization treatment is carried out may range from about room temperature, i.e., about 20° C., to about 250° C. The particular time and temperature employed is not narrowly critical. However, the higher temperatures are more effective and are normally employed when electrode and construction materials permit. Electrodes which were flushed with a stabilizing compound at room temperature show considerably improved life and performance characteristics when compared with untreated electrodes. Preferably the electrodes are exposed to an atmosphere of the selected stabilizing compound for a period of time ranging from 1 to 5 hours at a temperature of from about 35° C. to 250° C. Temperatures of about 250° C. provide greatly improved life-performance characteristics, while temperatures above 250° C. can cause undesirable structural changes in the electrodes.

While the exact mechanism by which the stabilization and improvement herein disclosed is not known, it is believed that sulfur, selenium, and arsenic are very strongly adsorbed at the metal surface and thereby prevent the adsorption of and reaction with other components of the electrolyte solution by the electrode material.

The following examples will further illustrate the present invention.

Example I

Two glass ampules were prepared, each containing 1 cubic centimeter of an aqueous solution of lithium nitrate and lithium iodide (5 normal with respect to lithium nitrate, and 2 normal with respect to lithium iodide) 3 cubic centimeters of an 0.25 normal solution of iodine in normal-butyl alcohol, about three quarters of a cubic centimeter of fritted aluminum oxide and about 2 square centimeters of platinum sheet. This combination is one commonly employed in the construction of solion devices. The piece of platinum in one of the ampules was cleaned and treated with hydrogen sulfide for 2 hours at 250° C. prior to insertion in the first ampule. The other piece of platinum was merely cleaned prior to insertion in the second ampule.

Both ampules were then stored at 160° F. After 114 days the ampule containing the piece of platinum which had been treated with hydrogen sulfide showed no change in color indicating that the concentration of iodine had not changed. Quantitative analysis of the concentration of iodine verified this. After only 7 days, the solution in the other ampule, which contained untreated platinum, was colorless indicating the absence of iodine.

Example II

Two glass ampules were prepared, each containing a small piece of fritted tantalum carbide on a tantalum substrate, in one cubic centimeter of a 25 percent methanol-75 percent water solution which was 0.05 normal in iodine and 1 normal in potassium iodide. Before insertion in the ampule one piece of tantalum carbide was flushed with hydrogen sulfide at room temperature, while the other piece was not. The ampule containing the treated tantalum carbide evidenced no change in color after storage for a period of eight months at a temperature of 140° F., while the solution in the ampule containing the untreated tantalum carbide darkened by a factor of 2 or 3 during the same period. The darkening of the solution was shown not to be due to an increase in the iodine concentration but rather to the presence of tantalum in the solution.

While the herein described method for the stabilization of inert electrodes has particular applicability to electrodes for use in solions it may also be advantageously employed in connection with inert electrodes for use in other types of electrochemical devices.

What is claimed is:

1. A method of making a solion device having an improved electrode, said electrode having at least the active surface portion thereof composed of a material selected from the group consisting of platinum and the carbides, nitrides, silicides, and borides of the transition metals from Groups IV-B, V-B, and VI-B of the Periodic Table which method comprises exposing the electrode to an environment comprising a member selected from the group consisting of hydrogen sulfide, hydrogen selenide, and arsine and then incorporating said electrode in said device.

2. The method according to claim 1 wherein said exposure is accomplished at a temperature of from about 20° C. to 250° C.

3. The method according to claim 1 wherein the electrode has at least the active surface portion thereof composed of tantalum carbide.

4. The method according to claim 1 wherein the environment to which said electrode is exposed comprises a gaseous atmosphere.

5. The method of claim 1 wherein the electrode is baked at a temperature of about 250° C. for a period of 2 hours during said exposure.

References Cited

UNITED STATES PATENTS 3,150,998　9/1964　Reitemeier _____ 136—86

JOHN H. MACK, *Primary Examiner.*

D. R. JORDAN, *Assistant Examiner.*